No. 646,045. Patented Mar. 27, 1900.
P. W. THOMSON.
CORN PLANTER.
(Application filed May 15, 1899.)
(No Model.) 3 Sheets—Sheet 1.
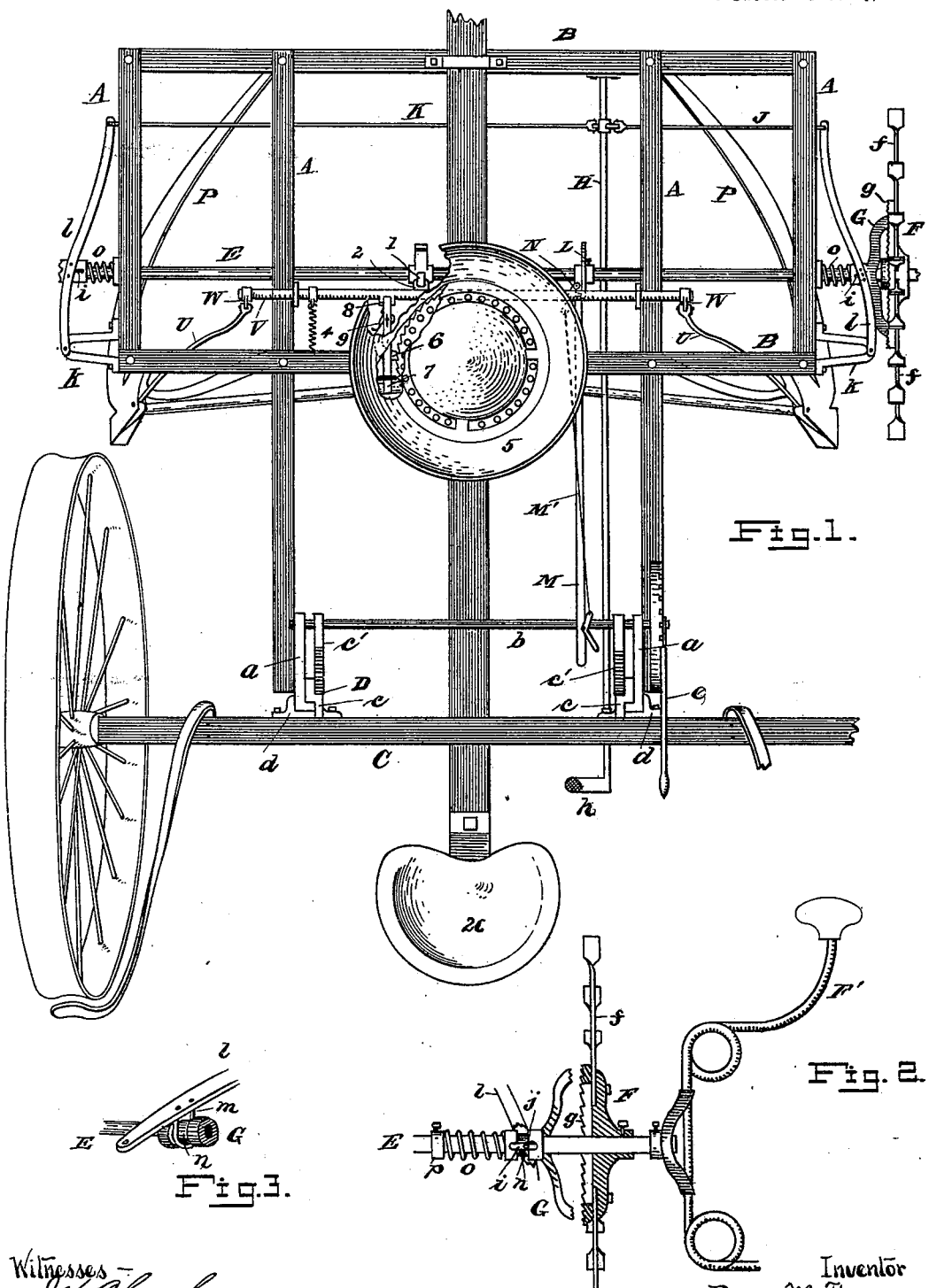
Witnesses
J. F. Blusch
Everett Miller.
Inventor
Presson W. Thomson
By L. M. Thurlow ATT'Y.

No. 646,045. Patented Mar. 27, 1900.
P. W. THOMSON.
CORN PLANTER.
(Application filed May 15, 1899.)
(No Model.) 3 Sheets—Sheet 2.
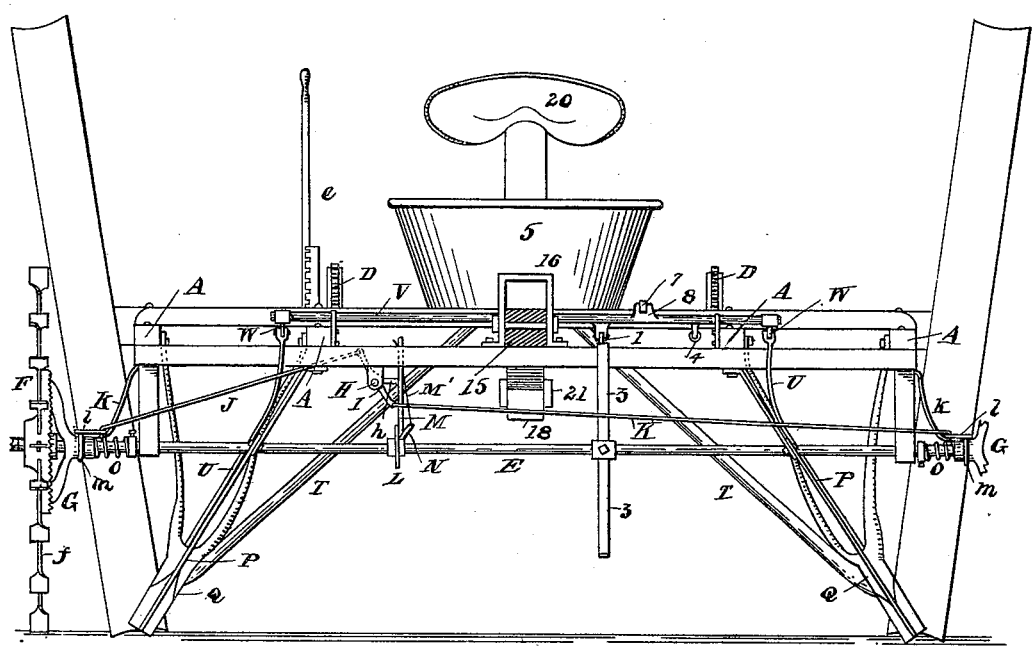
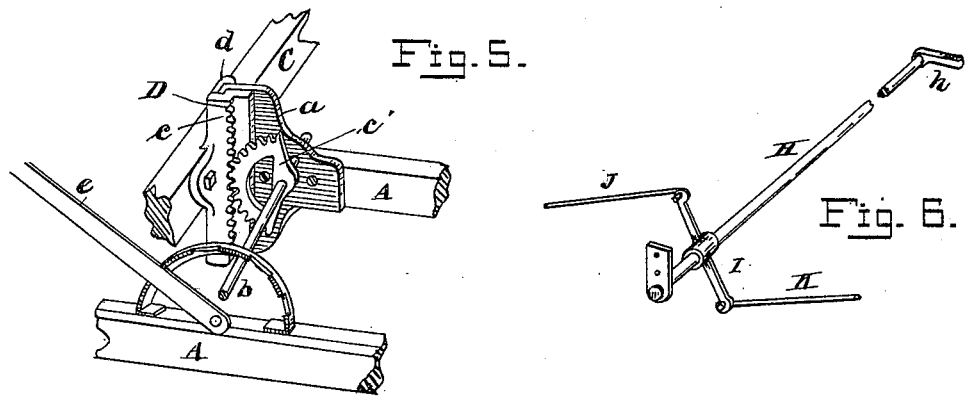
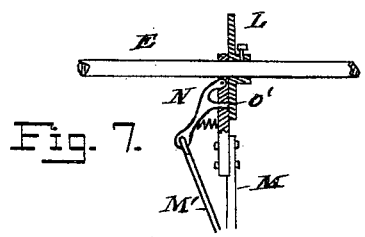
Witnesses— Inventor
Presson W. Thomson
By L. M. Thurlow,
ATTY No. 646,045. Patented Mar. 27, 1900.
P. W. THOMSON.
CORN PLANTER.
(Application filed May 15, 1899.)
(No Model.) 3 Sheets—Sheet 3.
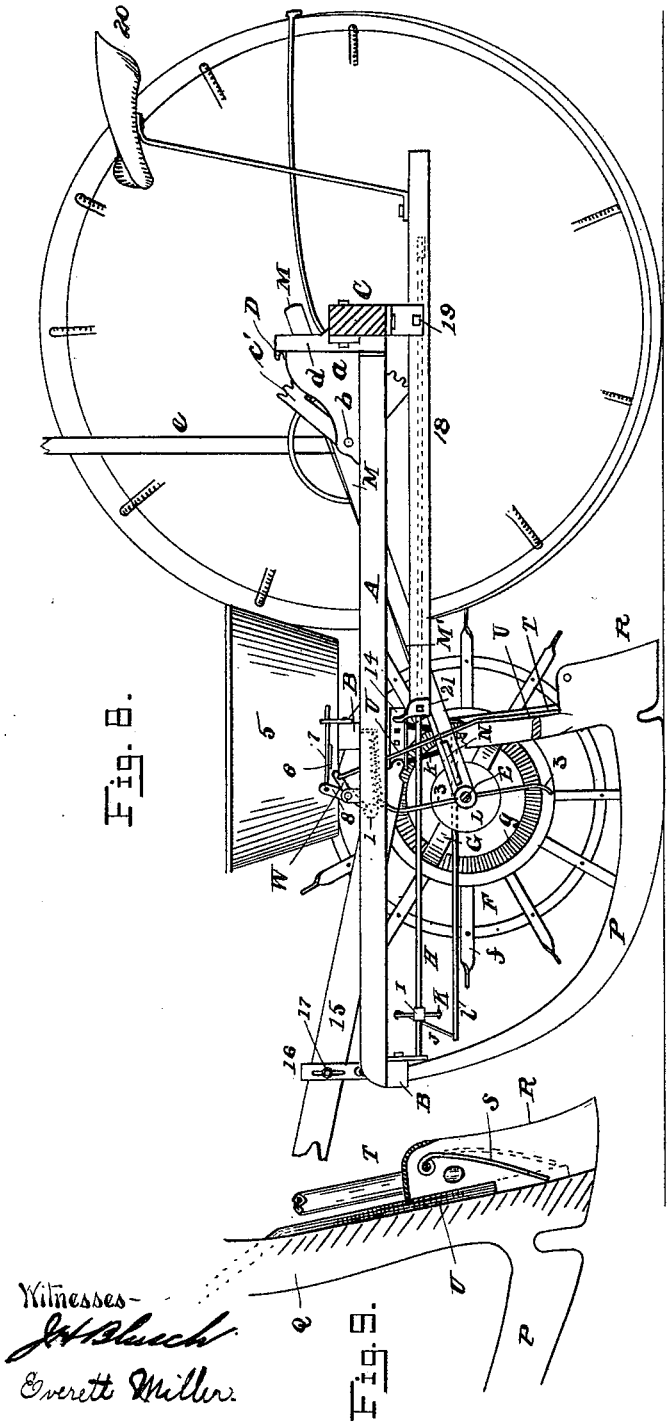
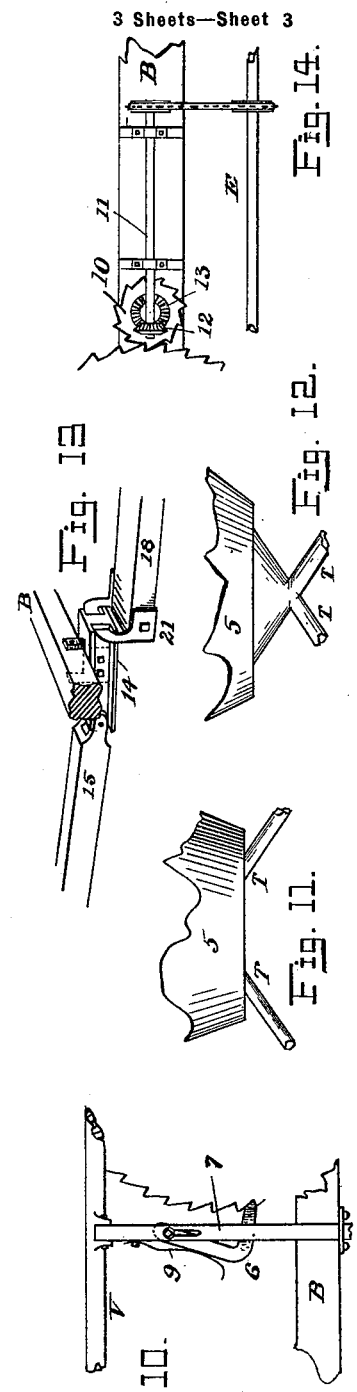
Witnesses—
J. H. Blucch
Everett Miller.
Inventor
Presson W. Thomson
By L. W. Thurlow
Att'y.

UNITED STATES PATENT OFFICE.

PRESSON W. THOMSON, OF YATES CITY, ILLINOIS, ASSIGNOR OF TWO-THIRDS TO FRANK D. THOMSON AND PRESSON W. THOMSON, JR., OF GALESBURG, ILLINOIS.

CORN-PLANTER.

SPECIFICATION forming part of Letters Patent No. 646,045, dated March 27, 1900.

Application filed May 15, 1899. Serial No. 716,966. (No model.)

*To all whom it may concern:*

Be it known that I, PRESSON W. THOMSON, a citizen of the United States, residing at Yates City, in the county of Knox and State of Illinois, have invented certain new and useful Improvements in Corn-Planters; and I do hereby declare that the following is a full, clear, and exact description of the invention, which will enable others skilled in the art to which it appertains to make and use the same.

This invention pertains to improvements in corn-planters, and has for its object to plant corn without the use of the check-row wire ordinarily employed and provide, instead, an operating mechanism driven by contact with the ground. I am aware that this idea is old; but the means employed in this instance I believe to be new.

The further objects of my invention are, first, to combine a check-rower and drill in the one machine; secondly, to incline the runners or shoes at an angle to more easily effect the opening of the soil for planting and place the carrying-wheels at an opposite angle to press the soil upon the seed sown; thirdly, to provide means for enabling the operator to stop and start the planting mechanism while the machine is moving in order to be able to drop the seed in perfect line with the rows already planted, and, fourthly, to provide a new force-feed for the shanks of the runners or shoes, whereby the seed is dropped at the proper moment in a positive manner, all of which will be clearly brought out hereinafter.

In the accompanying drawings, Figure 1 is a plan view of the planter. Fig. 2 is a top view of part of the planter, showing driving-wheel in part section and a marker for indicating the rows planted. Fig. 3 is a perspective view of a portion of Fig. 2 employed to disengage the driving parts. Fig. 4 is a front elevation of the planter. Fig. 5 shows mechanism for raising the planter-frame. Fig. 6 is a perspective view of a portion of the disengaging mechanism. Fig. 7 is a plan view, in part section, showing parts for adjusting the shaft carrying the driving-wheels, whereby the latter are made to properly register with the planted rows. Fig. 8 is a side elevation of the planter. Fig. 9 is an enlarged sectional view of the runner and shank, showing a plunger for forcing out the seed. Fig. 10 is a plan view of the check-row dog and seed-plate. Fig. 11 is an elevation of seedbox and seed-pipes. Fig. 12 is a modified form of the same. Fig. 13 is a perspective view of the tongue portion, showing connection with the planter-frame. Fig. 14 is a plan view of a drill attachment to replace the check-row mechanism.

The planter-frame consists of the longitudinal bars A A and transverse bars B B, bolted together in a rigid manner. The longitudinal members carry at their rear extremities bearing-plates $a\ a$, forming journals for a shaft $b$ and engaging a rack and pinion $c\ d$, secured to the axle C. The rack $c$ is provided with teeth D, which are engaged by a toothed sector $c'$ on said shaft $b$, while a lever $e$ serves to move the sector in one direction or the other to raise the planter-frame or lower it, as desired. This action results because the axle retains a fixed height, as is obvious.

I desire now to explain the dropping mechanism and the means for operating it.

Journaled beneath the frame described is a transverse shaft E, carrying at each end a loose fingered wheel F, one only being shown in the figures. This wheel consists of a number of spokes $f$, flat in cross-section. It will be observed that these spokes are set with their flat sides at right angles to the shaft carrying them, but have their ends twisted, as shown, in order to present a flat surface to the ground after the manner of a paddle-wheel. The idea is that the spokes after entering the ground will cut their way through it by means of their edges and not strain or bend, especially if the ground is hard and unyielding. Only enough broad surface is presented to grip the ground for an inch or two below the surface to accomplish the revolution of the shaft and the consequent dropping of the seed. In the figures, and especially Fig. 1, I show clearly a notched or toothed face $g$, affixed to the said wheel F, and on the shaft is a yoke G, having corresponding teeth to engage those on the said portion $g$. The yoke is held against rotary movement, except with the shaft, but may slide longitudinally when moved by a suitable disengaging device consisting of a rocker-shaft H, having bearings on the frame. Such shaft carries a cranked portion I, Fig. 6, having an upwardly and a downwardly extending arm, and with the one is connected a rod J and with the other a similar rod K, each running to the opposite side of the planter, for operating the yoke G. The shaft carrying the said cranked portion extends back near the operator's seat, and a footpiece $h$, formed thereon, serves to operate it when desired. A pin $j$ in the shaft E prevents the independent rotary movement of the yoke; but a slot $i$ in the latter permits the longitudinal movement. Brackets $k$, bolted to the frame, support levers $l$, having stirrups $m$, surrounding the stud of the yoke in a suitable groove $n$, as shown in Fig. 3. The forward ends of the levers are pivoted to the rods J and K, before mentioned. A spring O on the shaft bears against the yoke and keeps the latter in engagement with the toothed face $g$; but pressure of the foot on the lever at $h$ withdraws the yokes from the teeth and the planting is stopped, though the machine is still moving ahead. Since the wheel F is loose on the shaft, it is free to turn when the yoke is drawn away from it. I provide for the shaft E also a marker F', Fig. 2, and means for setting the wheel F and the marker when the planter is starting a new row. It is well known that the marker does not always register with the row previously planted, and therefore some substantial and efficient means must be employed to make this possible, using as little effort as possible. To this end I affix a plate L, Fig. 7, to the shaft E, and adjacent thereto is a lever M, carrying a pinch-lever N, having a pin or plunger $o'$ for binding the said plate through a suitable aperture in the said lever M. A rod M', attached to such lever N, passes rearwardly within reach of the operator's hand. When the wheels F are raised from the ground, the lever M is operated to move the shaft E and the parts connected therewith by a pressure of the handpiece controlling the said pinch-lever. It will be seen that the shaft can be gradually turned a full revolution by means of this mechanism, if desired, by merely gripping the lever, raising it, releasing the pressure, and lowering the lever, and repeating the operation as often as needed. The marker F' is composed of two spring-arms, and the entire revolution of the shaft carrying it is not necessary, but rather a part of a half-revolution is sufficient to cause one arm of such marker to descend upon the desired point on the ground. When the wheels are in the ground and it is desired to bring the marker into register, it is only necessary to depress the footpiece $h$ to disengage the yokes from the said wheels. In doing this, as before stated, the seed-dropping is suspended. Then as the marker (which is affixed to the shaft and stops with the planting) reaches a position where it will register with the former marks the mechanism is again permitted to operate by removing the foot and the dropping continues. Evidently these features are valuable ones in a planter of this character. The runners P P are inclined at an angle away from the center of the planter, as shown in Fig. 4, and the carrying-wheels are inclined in the opposite direction. The purpose of this is that the process of cutting the soil will be much easier. It is easier to cut with a knife when it is inclined at an angle than when used perpendicularly, and the same is true of the runners of the planter. When followed by the oppositely-inclined wheels the planting is very satisfactory. I regard this as a valuable feature in my invention, as it requires less power from the horses, makes a smoothly-operating planter, and is satisfactory in every way.

I provide a "force-feed", as I term it, for the runner-shanks, as depicted in Fig. 9, in which Q is the shank and R a rearwardly-extending housing, having a spring S therein, which catches and holds the seed in the conduit T until a plunger U is brought down to the position shown by dotted lines, thus thrusting the spring backward and dropping the seed into the furrow, at the same time clearing the heel of the shoe of any obstructions to the passage of the seed—such, for instance, as earth—which may have accumulated in the shoe. When the plunger rises, the spring regains its closed position, ready to receive more seed. The mode of operating the plunger may now be understood. In Figs. 1, 4, and 8 is shown a rocker-shaft V, supported above the frame and lying parallel with the shaft E. Said shaft V carries at each end a crank W, to each of which is loosely attached the upper end of a plunger U, described. On the shaft is a roller (indicated by the numeral 1) carried on an arm 2. On the shaft E below shaft V is a revolving sweep or dog consisting of two radial arms 3, which in revolving strike the said roller 1 and depress the cranks W and plungers. A suitable spring 4 returns the shaft to its first position after each movement, thus raising the plungers ready for another discharge. A seedbox 5 on the center of the planter-frame has the usual revolving seed-plate, provided with a number of holes for the entrance of seed, all of which is commonly used and need not be described here. Such plate is serrated or toothed on its edge and is revolved by means of a pawl 6, pivoted on a sliding rod 7, loosely attached to an arm 8 on said shaft V. A spring 9 serves to keep the pawl in engagement with the serrations or teeth on the plate, and as the movement of the shaft results from the stroke of the arms 3 the seed-plate is moved to drop seed into the conduits T and thence to the shanks of the runners. The conduits may be connected with the seedbox, as shown in Fig. 11, or as in Fig. 12, wherein they connect with a conical-shaped bottom, the latter figure being a modified form. The passage of the seed to the runners is all well known in operation. The machine as I have described it is arranged for check-row planting. Evidently each time an arm 3 meets the roller 1 a hill is deposited. The hills are readily kept in line by the means hereinbefore set forth, or the planting may be entirely suspended by the same mechanism.

I am able to easily and quickly change the check-rower form to a drill by merely substituting for the pawl and sliding bar 6 and 7, respectively, a suitable wheel 10, journaled on the central transverse bar of the planter-frame adjacent to the seed-plate to engage with the latter and provide a shaft 11, having a beveled gear-wheel 12 meshing with one, 13, on said wheel 10. Such shaft is driven by means of suitable sprockets and chain from the shaft E. This is clearly shown in Fig. 14, without reference, however, to proportions. I am thus enabled to change my corn-planter into a press-drill. Obviously I may accomplish the same purpose by simpler methods.

More than one seedbox may be employed and the machine may otherwise be changed to suit the fancy without losing sight of the spirit of the invention.

The tongue connection for the planter may be understood from what follows: Secured to the center of the planter-frame in a suitable manner is a section of an I-beam 14, to the forward end of which is pivoted the end of the tongue 15. The latter passes through a stirrup 16 on the front cross-bar and is adjustable therein by means of a bolt 17. A beam 18 is pivotally suspended from the axle at 19, its rear end carrying the seat 20 and its forward end a fork 21 to hang in the said I-beam. Since the tongue is hung at its forward end on the horse's neck, it is evident that when throwing the lever e backward the frame will be raised and the seat will aid in the operation by the weight of the operator. In falling, the seat being pivoted at 19 through said bar 18 will cause the latter to rise at its forward end and will naturally and of necessity slide within the I-beam. The runners and wheels F will be raised from the ground and out of contact therewith. The machine is then in condition for transportation to or from the field. I may of course use equivalent means for accomplishing the latter object.

An advantage in the construction just described is that both runners and shanks will be raised out of the ground simultaneously by reason of the rigidity of the machine and its ability to resist a sidewise teetering motion. By the use of the lever e described both runners will be raised and lowered simultaneously.

I claim—

1. A corn-planter whose runners are inclined from the usual vertical position to a slanting or angling position throughout their entire height, substantially as set forth.

2. A corn-planter having its runners inclined from the usual vertical position and its wheels also inclined from the vertical position but in an opposite direction to that of the said runners substantially as and for the purposes set forth and described.

3. In a corn-planter, the combination of the usual runners inclined from the customary vertical position, the carrying or covering wheels inclined in the opposite direction, the wheels following the runners, whereby the corn is deposited and covered as described, mechanism for dropping the seed, and means for operating such mechanism for the purposes set forth.

4. In a corn-planter, the combination of the usual runners inclined from the customary vertical position, the carrying or covering wheels inclined in the opposite direction, whereby the corn is deposited and covered as described, mechanism for dropping the seed, and means for operating such mechanism, such operating means adapted for movement by contact with the ground substantially as set forth.

5. In a corn-planter, a seed-dropping mechanism consisting of the combination of the runners P inclined at an angle from the vertical position, a recess R in the shank of each runner, a seed-conduit T entering each recess, a spring S in the recess for holding the seed, plungers U entering the recesses and opening the springs to drop the seed, a shaft V for operating the plungers, a shaft E, a trip 3 thereon for moving the shaft V, a spring 4 for the latter, a wheel F at each end of the shaft E adapted to engage with the ground for driving the latter shaft substantially as set forth and described.

6. In a corn-planter, a seed-dropping mechanism consisting of the combination of the runners P inclined at an angle from the vertical position, a recess R in the shank of each runner, a seed-conduit T entering each recess, a spring S in the recesses for holding the seed, plungers U entering the recesses and opening the springs S to drop the seed, a shaft V for operating the plungers, a shaft E, a trip 3 thereon for moving the shaft V, a spring 4 for the latter, a wheel F at each end of the shaft E adapted to engage with the ground for driving the latter shaft, and means for engaging and disengaging the said wheels and shaft, consisting of a toothed face g on the inner side of each of said wheels, a yoke G on the shaft adjacent to the said toothed face and having corresponding toothed faces, such yoke adapted to have a longitudinal movement on the shaft but fixed against rotary movement except with such shaft, a lever l pivoted to the yoke, said lever connected at one end to the planter-frame, the other end controlled by suitable means for disengaging the yokes from the wheels F, and springs O for reëngaging the parts substantially as set forth.

7. In a corn-planter, a seed-dropping mechanism consisting of the combination of the runners P inclined at an angle from the vertical position, a recess R in the shank of each runner, a seed-conduit T entering each recess, a spring S in the recess for holding the seed, plungers U entering the recesses and opening the springs S to drop the seed, a shaft V for operating the plungers, a shaft E, a trip 3 thereon for moving the shaft V, a spring 4 for the latter, a wheel F at each end of the shaft E adapted to engage with the ground for driving the latter shaft and means for engaging and disengaging the said wheels and shaft, consisting of a toothed face $g$ on the inner side of each of said wheels, a yoke G on the shaft adjacent to the said toothed face and having corresponding toothed faces, such yoke adapted to have a longitudinal movement on the shaft but fixed against rotary movement except with such shaft, a lever $l$ pivoted to the yoke, said lever connected at one end to the planter-frame, a shaft H at right angles to the shaft E, a footpiece $h$ at one end, arms I thereon, rods J and K connecting the said arms I and the levers $l$ substantially as set forth and for the purposes described.

8. A corn-planter having a force-drop within the runner-shank, consisting of a plunger U operated to move vertically therein, a shaft V for operating the plunger in each shank, a shaft E for imparting movement to such shaft V, a wheel F on each end of the shaft E, means for engaging and disengaging the said wheels and shaft, and means for moving the shaft in its bearings, to bring the planted rows into register, which consists of a plate L secured to the said shaft, a lever M having bearings on the shaft adjacent to said plate L, a lever N pivoted to such lever M and having a pin $o'$ for binding the said plate L, a rod $M'$ for operating the lever N and a spring for releasing the said lever and plate for the purposes set forth and described.

9. In a corn-planter, a force-feed mechanism consisting of a main shaft E adapted to be operated from the ground, the runners P P, recesses R therein, springs S in the recesses seed-conduits opening into the recesses, plungers U entering the recesses and adapted to open the spring, a shaft V for operating the plungers, said shaft V receiving its movement from the shaft E, a seedbox for supplying grain to the runners through the conduits, a rod 7 having the pawl 6 for operating the seed-plate in the seedbox, and a spring 4 for returning the shaft V and plungers U to their normal positions after each forced movement substantially as set forth.

10. The combination of a planter-frame A, B, a transverse shaft E journaled thereto, a two-arm trip 3 on said shaft adapted for operating the seed-dropping mechanism, a spoked wheel F, loosely mounted on each end of the shaft to engage with the ground, a serrated or toothed wheel $g$ secured to each of the latter, and shifting sleeves on the shaft for carrying the yokes G adapted to engage said wheels $g$, said yokes adapted to turn with the shaft and slide longitudinally thereon, a spring O on the shaft between said sleeve and the shaft-bearings which normally keep the said yokes and toothed wheels in engagement, brackets $k$ on the frame A, levers $l$ pivoted thereto and adapted to shift the said sleeves and yokes to release them from the drive-wheels F to stop the dropping of seed, a rock-shaft H journaled on the frame at right angles to the shaft E, arms $l'$ on the shaft at diametrically-opposite sides thereof, rods J and K attached to the arms and levers, substantially as set forth and a footpiece on the said rock-shaft for rocking the latter, substantially as described and shown.

11. In a corn-planter, the combination of the main frame A, B, the I-beam secured to the rear transverse beam B, the tongue 15 connected therewith, the beam 18 having sliding connection with the said I-beam and having pivotal connection with the axle C, a vertical rack and guide secured to the axle, a sliding portion $a$, for the guide, a shaft $b$ carried in the said sliding portion, a toothed sector $c'$ on such shaft, for engaging the rack, and a lever on the shaft for operating the parts to raise and lower the planter substantially as set forth.

In testimony whereof I affix my signature in presence of two witnesses.

PRESSON W. THOMSON.

Witnesses:
J. W. WOOD,
DAVID CORBIN.